United States Patent
Shimomura et al.

(10) Patent No.: US 6,241,396 B1
(45) Date of Patent: Jun. 5, 2001

(54) SEALING DEVICE FOR A ROLLING BEARING

(75) Inventors: Yuji Shimomura; Toshiharu Takamura; Hidenobu Magami; Tomoyuki Aizawa; Sadayuki Tanaka, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/227,918

(22) Filed: Jan. 8, 1999

(30) Foreign Application Priority Data

Jan. 8, 1998 (JP) .................................................. 10-013162
Dec. 22, 1998 (JP) .................................................. 10-376202

(51) Int. Cl.⁷ .................................................... F16C 33/72
(52) U.S. Cl. ........................................... 384/477; 277/551
(58) Field of Search .................................... 384/477, 484, 384/485, 486; 277/551, 572, 576, 577

(56) References Cited

U.S. PATENT DOCUMENTS

| Re. 36,804 | * | 8/2000 | Kajihara et al. | ................. 384/484 X |
| 3,140,129 | * | 7/1964 | Koss | ..................... 384/477 |
| 3,856,368 | * | 12/1974 | Anderson | ............................. 384/485 |
| 4,427,242 | * | 1/1984 | Otto | ..................... 384/486 |
| 4,566,811 | * | 1/1986 | Lundgren | ............................. 384/484 |
| 4,650,195 | * | 3/1987 | Dreschmann et al. | ............... 384/486 |
| 4,692,040 | | 9/1987 | Ebaugh et al. . | |
| 4,733,977 | * | 3/1988 | Eisenmann et al. | ................. 384/477 |
| 5,002,406 | * | 3/1991 | Morton et al. | ........................ 384/477 |
| 5,129,744 | | 7/1992 | Otto et al. . | |
| 5,242,229 | * | 9/1993 | McLarty | ............................. 384/477 X |
| 5,340,124 | * | 8/1994 | Jankowski et al. | .............. 384/484 X |
| 5,362,159 | | 11/1994 | Kufner et al. . | |
| 5,419,642 | * | 5/1995 | McLarty | ............................. 384/447 X |
| 5,860,748 | * | 1/1999 | Okumura et al. | .................... 384/486 |
| 6,003,876 | * | 12/1999 | Yamagishi et al. | .............. 384/484 X |

FOREIGN PATENT DOCUMENTS

| 55-22648 | 6/1980 | (JP) . |
| 3-59520 | 6/1991 | (JP) . |
| 5-86031 | 11/1993 | (JP) . |
| 9-88983 | 3/1997 | (JP) . |

* cited by examiner

Primary Examiner—David A. Bucci
Assistant Examiner—Colby Hansen
(74) Attorney, Agent, or Firm—Sughrue, Mion, Zinn, Macpeak & Seas, PLLC

(57) ABSTRACT

A sealing device for a roll bearing which includes an outer ring, an inner ring, a rolling element rotatably interposed between the outer and inner rings, and a retainer, comprises a seal holder having a seal holder portion and a seal body attached to the seal holder portion. A portion of the retainer is received in a sealing space defined by the seal holder portion while the portion of the retainer is being disposed outside a range of interference with the seal holder portion. The sealing device further comprises conical surfaces 10 and 19 which are provided as fitting surfaces of a seal holder portion 9a and a seal body 17 fit to the seal holder portion 9a. Accordingly, a space 23 into which one end of a retainer of the bearing is receivable can be formed, and the inside diameter d of the seal holder portion 9a can be reduced.

16 Claims, 11 Drawing Sheets

PRIOR ART

FIG.21

SEALING DEVICE FOR A ROLLING BEARING

BACKGROUND OF THE INVENTION

The present invention related to a sealing device for a rolling bearing for isolating the bearing from outside to prevent water, scales from entering the interior of the bearing and rolling element lubricant e.g., grease or oil air lubricant from leaking out of the bearing.

A tern "seal holder portion" means a portion on which a seal body is mounted, which formed within a seal holder being separately provided and closely engaged with the end face of an outer ring or a portion on which the seal body is mounted, which is directly formed on the end of the outer ring without mounting of a seal holder separately provided.

Figure 20A:
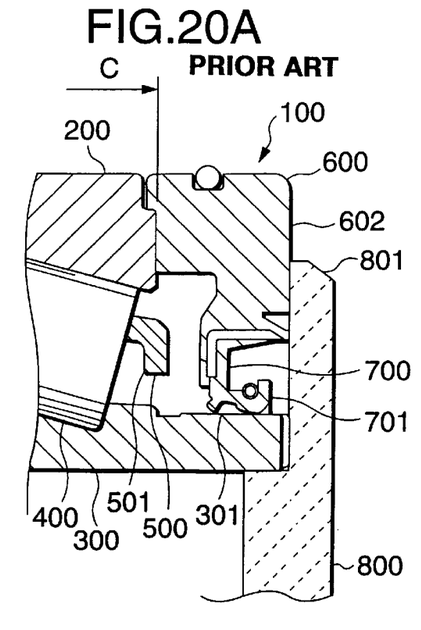
FIGS. 20A and 20B are longitudinal sectional views showing a conventional sealing devices respectively.
Figure 20B:
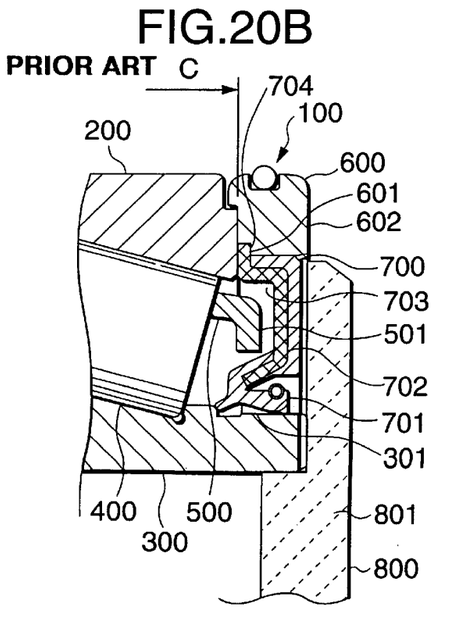

FIGS. 20A and 20B shows a sealing device 100 for a four-raw tapered roller bearing used mainly for a steel rolling mill. A sealing device of the type in which a sealing member 700 is fit into a seal holder portion 602 of a ring-like seal holder 600 is typically known.

Figure 21:
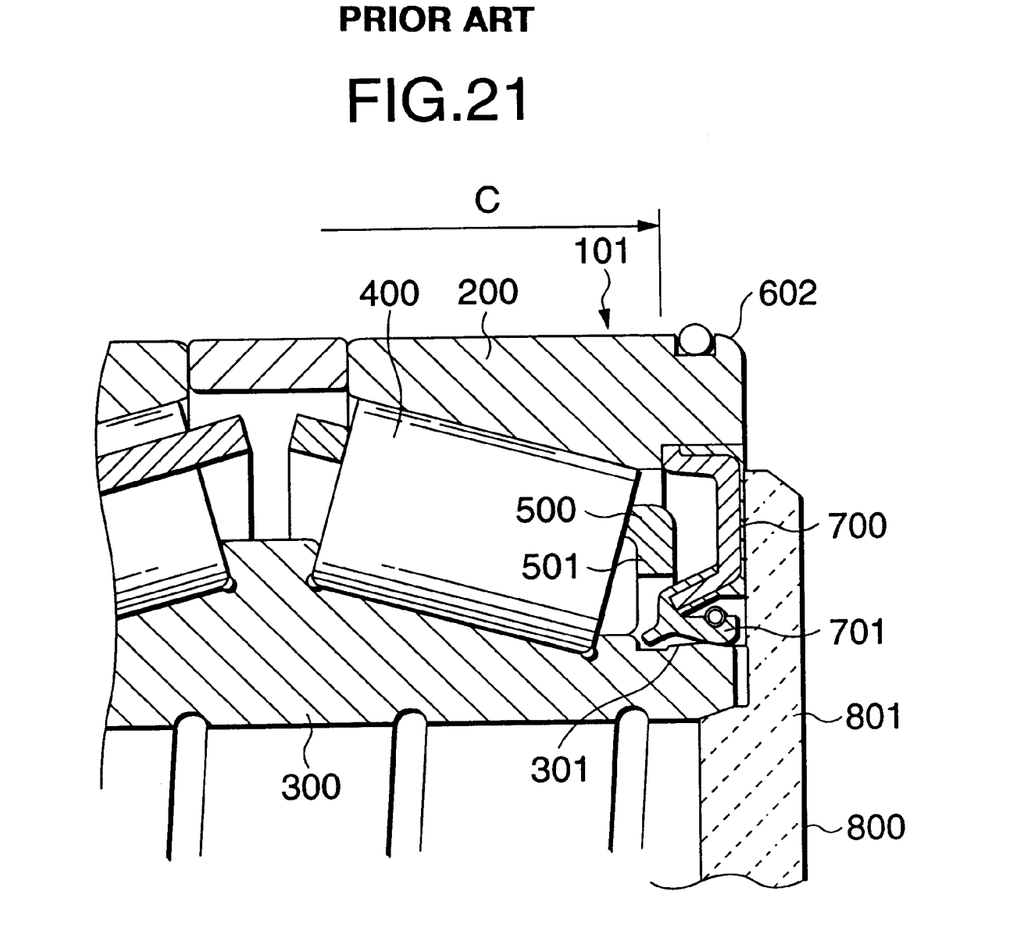
FIG. 21 is a longitudinal sectional view showing another conventional sealing device.

Another sealing device 101 not provided with a separate seal holder as shown in FIG. 21 is also known. In the sealing device 101, a sealing member 700 is fit into the seal holder portion 602 directly formed on the outer ring.

In the sealing device 100 of FIGS. 20A and 20B, to seal the bearing, the side wall of the seal holder 600 is brought into close contact with an outer ring 200, and a lip portion 701 of the sealing member 700 is made to slidably contact with the outer peripheral surface 301 of an inner ring 300. The same thing is correspondingly applied to the sealing device of FIG. 21.

Reference is made to FIG. 20A. The bearing includes a cage type holder 500. The bottom 501 of the cage type holder 500 (so called as a retainer) is positioned off the bearing width C. In other words, the bottom 501 of the cage type holder 500 is protruded from the side edge of the outer ring 200.

In order to avoid the interference among the cage type holder 500, the sealing member 700 and the seal holder 600, it is necessary to increase the width of the seal holder 600 and to locate the soaling member 700 close to outside. Such a structural requirement limits the space or a bearing unit, and hence of necessity reduces the load capacity. To cope with this, a sealing device as shown in FIG. 20B is proposed.

In the sealing device 100 of FIG. 20B, the sealing member 700 includes a recessed portion 702. The space 703 defined by the recessed portion 702 may receive the bottom 501 of the cage type holder 500. This structural feature brings about advantages: no interference of the cage type holder 500 with the sealing member 700, the width reduction of the seal holder 600, and the increase of the load capacity of the bearing.

Figure 19:
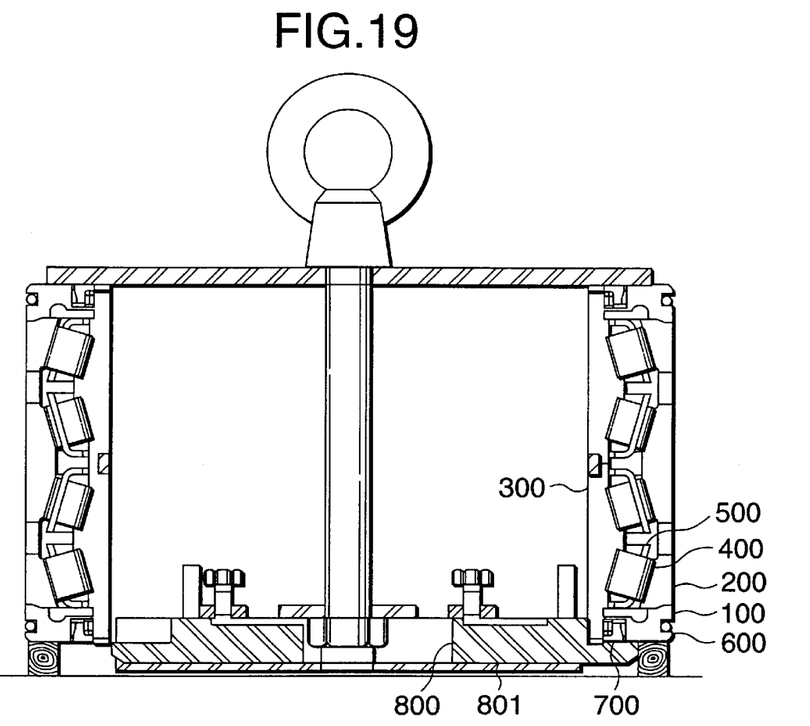
FIG. 19 is a longitudinal sectional view showing a state where a bearing suspending tool is attached to the four-raw tapered roller bearing.

The four-raw tapered roller bearing must be attached to and detached from the chock in a state that it is assembled and sealed. Because of this, the necessity is to use a bearing suspending tool 800 (FIG. 19), used for-only the purpose of bearing suspension.

In the sealing device of FIG. 20B, the recessed portion 702 is horizontally extended from a flange portion 704 sandwiched between a groove 601 of the seal holder 600 and the end face of the outer ring. The structure ensues the increase of the inside diameter of the seal holder 600, and the height of the sealing member 700 when viewed in cross section. For this reason, the FIG. 20B sealing device rejects the use of the bearing suspending tool 800 when an assembly of the sealing device and the bearing is attached to the chock through the bearing suspending tool.

SUMMARY OF THE INVENTION

Accordingly, it is an object of the present invention to provide a sealing device for a rolling bearing which is capable of satisfying the requirement for eliminating the interference of the sealing member with the cage type holder of the bearing, maintaining the high load capacity performance, and accepting the bearing suspending tool usually used for the bearing.

The above object can also be achieved by a sealing device for a roll bearing having a seal holder portion of a seal holder, separately provided, which is directly formed on or closely engaged with an outer ring, and a seal body attached to said seal holder portion, wherein one end of a holder is put into a seal space of said seal holder portion so as to avoid its interference with said seal body, the improvement being characterized in that the inside diameter of said seal holder portion is reduced. With this unique structure, a set space for a bearing suspending tool is secured.

More specifically, the inside diameter of the seal holder portion is minimized in a sealing device in which 1) a seal is mounted on a seal holder portion as a portion on which a seal body is mounted, which formed within a seal holder being separately provided and closely engaged with the end face of an outer ring or a portion on which the seal body is mounted, which is directly formed on the end of the outer ring without mounting of a seal holder separately provided, and 2) the seal body slidably contacts with the outer peripheral surface of the inner ring, whereby the bearing is isolated from outside.

In the sealing device constructed described above, the seal body is structured so as to withstand a pressure created when said bearing is lifted. Specifically, the seal body has such a seal structure including a metal ring (reinforcing core member) with a large or irregular cross-sectional area and enabling a seal to be directly lifted with a bearing suspending tool.

DETAILED DESCRIPTION OF THE PREFERRED EMBODIMENTS

A preferred embodiment of a sealing device for a rolling bearing, which is constructed according to the present invention will be described.

Figure 1:
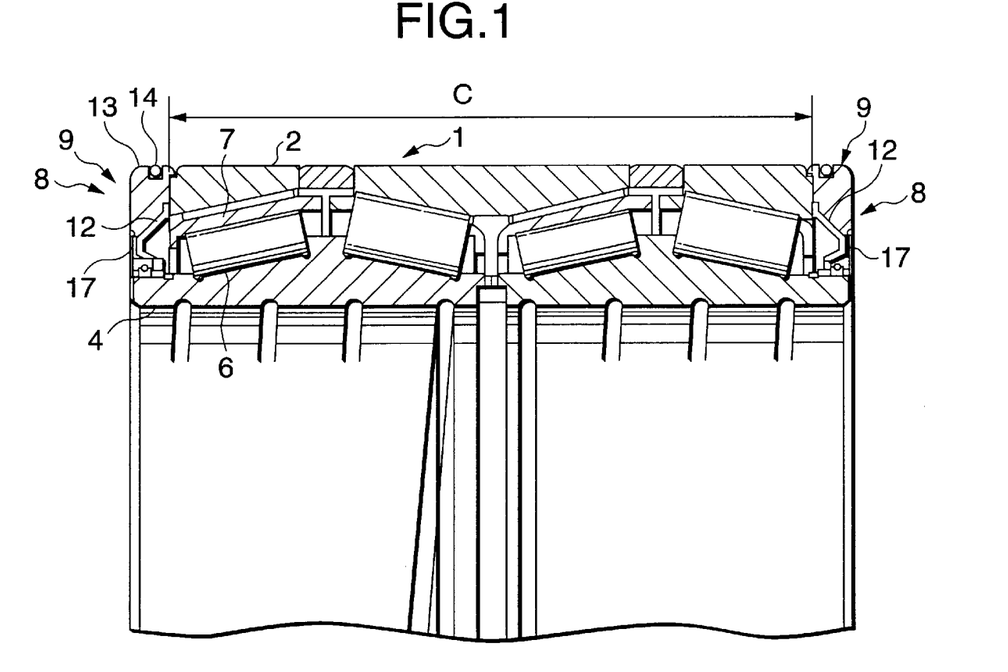
FIG. 1 is a longitudinal sectional view showing a four-raw tapered roller bearing equipped with a sealing device for a rolling bearing constructed according to the present invention.
Figure 2:
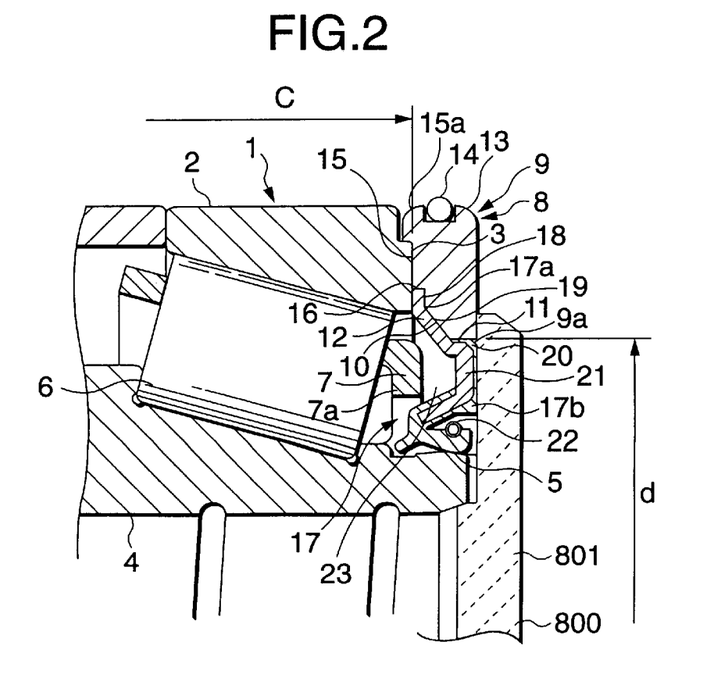
FIG. 2 is a longitudinal sectional view showing a first embodiment of a sealing device for a rolling bearing, which is constructed according to the present invention.

FIG. 1 is a longitudinal sectional view showing a four-raw tapered roller bearing equipped with a sealing device for a rolling bearing constructed according to the present invention. FIG. 2 is a longitudinal sectional view showing a first embodiment of a sealing device for a rolling bearing, which is constructed according to the present invention.

<First Embodiment>

In those FIGS. 1 and 2, reference numeral 1 designates a bearing unit; 2 denotes an outer ring; 4 defines an inner ring; 6 is a rolling element (tapered roller); 7 is a holder; and 8 is a sealing device. As shown, the sealing device 8 is structured such that one end 7a of the holder 7 is placed in a seal space of a seal holder portion 9a of a seal holder 9 so as to avoid its interference with a seal body 17. This unique structure reduces the inside diameter d (FIG. 2) of the seal holder portion 9a and provides a set space for setting a bearing suspending tool 800 thereto.

The bearing unit 1, which comprises the outer ring 2, the inner ring 4, the rolling element 6 and the holder (so called as a retainer) 7, may take a general structure. Therefore, no description on details of the bearing unit will be given, and the invention is not limited to the illustrated structure of the bearing unit.

Structurally, the sealing device includes a ring-like sealing device 8 separately provided, and a seal body 17. The sealing device 8 is closely engaged with the outer ring 2. The seal body 17 is mounted on the inner peripheral surface of the seal holder portion 9a of the seal holder 9, and slidably contacts with the outer peripheral surface 5 of the inner ring 4. Functionally, the sealing device 8 isolates the bearing from outside.

In the seal holder 9, a conical surface 10 is tapered from its contact surface 15 to its inner surface. A circumferential inner surface 11 of the holder is horizontally extended from the end of the conical surface 10.

An O-ring 14 is put in the outer peripheral surface 13 of the seal holder 9 to thereby secure a sealing of a bearing housing not shown. A protrusion 15a, shaped like a ring, is protruded from one side (closer to the contact surface 15) of the seal holder 9. The protrusion 15a is put on the outer peripheral surface 3 of the outer ring 2.

Rubber 17b is vulcanized to a core bar 17a to form the seal body 17 integrally. The seal body 17 is formed with a flange portion 18, a conical surface 19, a fitting portion 20, a rectangular portion 21, and a lip portion 22. Materials other than metal and rubber, available for the seal body 17, are hard material (e.g., plastics) and high polymer having an elasticity which is substantially equal to of the rubber (e.g., polytetrafluoroethylene: PTFE Other suitable materials may also be used for the seal body 17, as matter of course.

The flange portion 18 is sandwitched between a groove 16 of the seal holder 9 and the end face of the outer ring 2, whereby the seal body 17 is fixed.

The conical surface 19 is slanted from the end of the flange portion 18 in parallel with the conical surface 10 of the seal holder 9. The fitting portion 20 is provided at the upper end of the conical surface 19, while conforming in shape to the cylindrical inner surface 11 of the seal holder 9. The fitting portion 20 is made of the rubber 17b.

The fitting portion 20 is fit to the cylindrical inner surface 11 of the seal holder 9, and the lip portion 22 of the seal body is slidably engaged with the outer peripheral surface of the inner ring 4, whereby the bearing is sealed. The structure of the lip portion 22 is not limited to the Illustrated one. The slant of the conical surfaces 10 and 19 may properly be selected.

With provision of the conical surfaces 10 and 19 for the fitting surface 12 of the seal holder 9 and the seal body 17, a space (holder receiving space 23 formed on the inner surface of the conical surface 19) defined by the slanted conical surfaces receives the end 7a of the holder 7 located out of the bearing unit 1. With this structural feature, there is no chance that the holder 7 interferes with the seal body 17, and the inside diameter of the seal holder portion 9a may be reduced (FIG. 2). Additionally, the width of the bearing unit 1 is not reduced, and the outer surface of the seal holder 9 may be reduced.

With the reduction of the inside diameter of the seal holder portion 9a, when the bearing suspending tool 900 is used, a pawl 801 of the bearing suspending tool is brought into contact with the outer surfaces of the inner ring 4 and seal holder 9, but does not press the seal body 17. Therefore, there is no chance of damaging the seal body 17 (FIG. 2).

<Second and Third Embodiments>

As described above, the sealing device is provided with both the conical surface 10 and the conical surface 19 in the first embodiment. The present invention is applicable to a sealing device where only the seal holder 9 has a tapered surface as a conical surface 10 (second embodiment, FIG. 3), and a sealing device where only the seal body 17 has a tapered surface as a conical surface 19 (third embodiment, FIG. 4).

Figure 3:
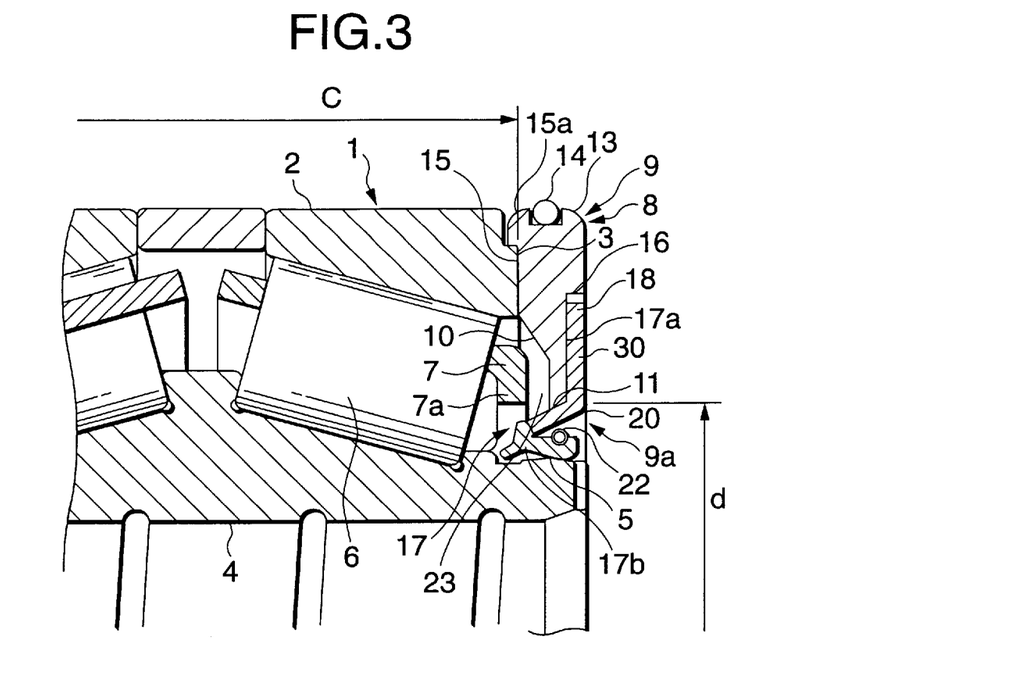
FIG. 3 is a longitudinal sectional view showing a second embodiment of a sealing device for a rolling bearing, which is constructed according to the present invention.

The second embodiment of the invention will be described. The seal holder 9 is tapered from the contact surface 15 contacting with the outer ring 2 toward its inner peripheral surface, to thereby form a conical surface 10. The holder 9 is vertically extended from the lower end of the conical surface 10. A cylindrical inner surface 11 is extended from the lower end of the vertical surface. Rubber 17b is vulcanizing processed to a core bar 17a to form the seal body 17. The seal body 17 is not provided with a conical surface. The seal body 17 includes an elongated flange portion 18 to be fit into a recess portion 30 formed in the outside surface of the seal holder 9, a fitting portion 20 which is horizontally extended from the lower end of the flange 18 and fit to the cylindrical inner surface 11, and a lip portion 22 provided at the tip of the fitting portion 20.

Figure 4:
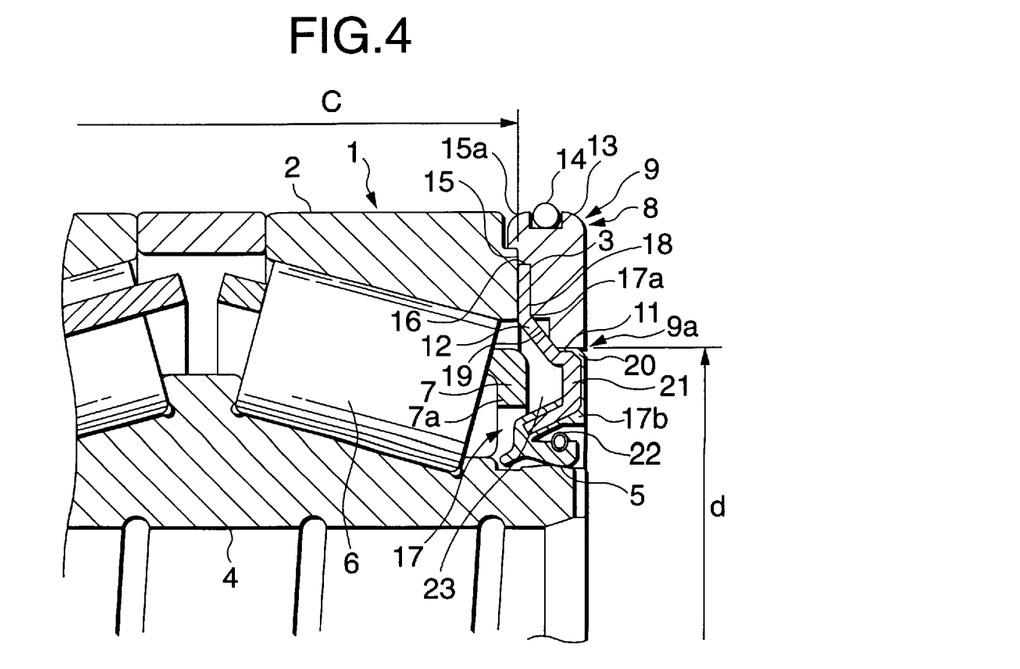
FIG. 4 is a longitudinal sectional view showing a third embodiment of a sealing device for a rolling bearing, which is constructed according to the present invention.

The third embodiment of the invention will be described. The seal holder 9 includes a groove 16 axially extended from its contact surface with the outer ring 2 (groove 16 cooperates with the end face of the outer ring 2 to nip the flange 18 of the seal body 17), a stepped part provided under the groove 16, and a cylindrical inner surface 11 horizontally extended from the lower end of the stepped part.

Note that the seal body 17 has substantially the same structure as of the seal body 17 already described in connection with FIG. 2, but the flange 18 is longer than that of FIG. 2.

The remaining construction of the second and third embodiments is substantially the same as of the first embodiment shown in FIG. 2. Like or equivalent portions are designated by similar reference numeral in the first embodiment and its related figures, for simplicity.

The thus constructed sealing device of the third embodiment can reduce the inside diameter d of the seal holder portion 9a.

<Fourth and Fifth Embodiments>

In fourth and fifth embodiments (FIGS. 5 and 6), the seal holder 9 has an R-shaped surface 24 in place of the conical (tapered) surface. Any special limit is not placed on the configuration of the R-shaped surface.

Figure 5:
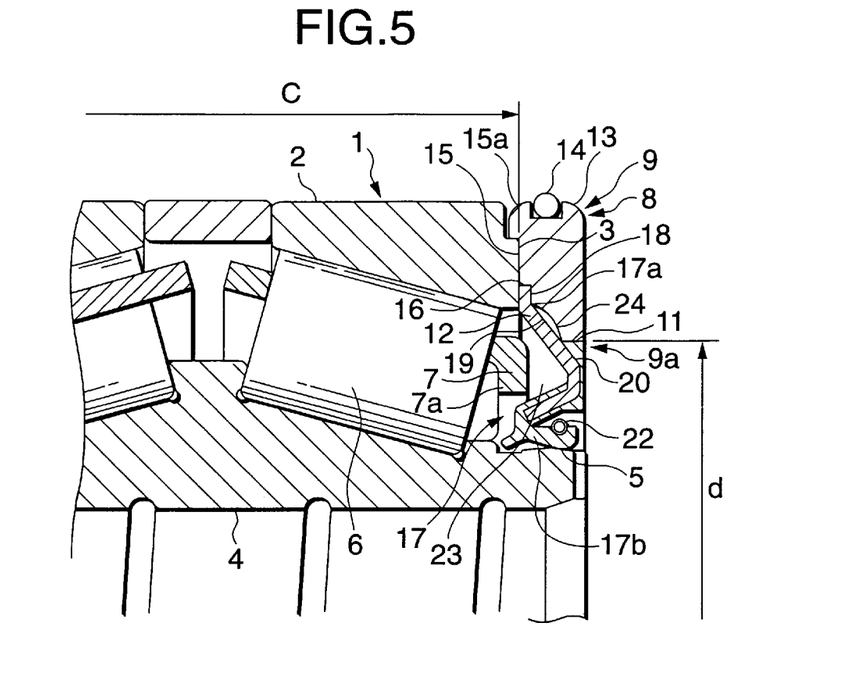
FIG. 5 is a longitudinal sectional view showing a fourth embodiment of a sealing device for a rolling bearing, which is constructed according to the present invention.
Figure 6:
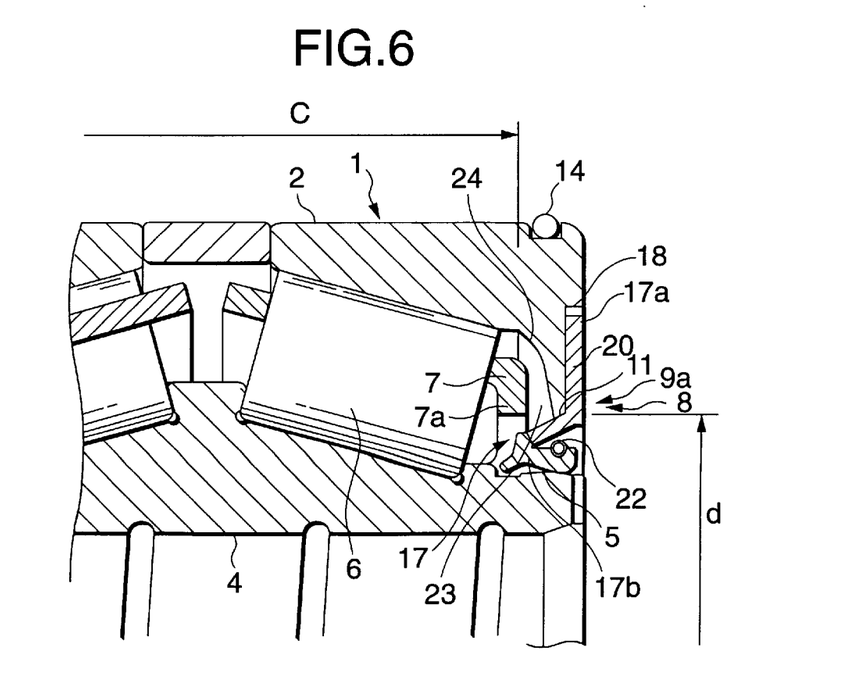
FIG. 6 is a longitudinal sectional view showing a fifth embodiment of a sealing device for a rolling bearing, which is constructed according to the present invention.

In the fourth embodiment, the seal body 17 has a conical surface 19. In the fifth embodiment, the seal holder 9 is not used, but a seal holder portion 9a is directly formed on the outer ring 2. The fifth embodiment is substantially the same as the second embodiment (FIG. 3) except that the seal holder portion 9a is directly formed on the outer ring 2, and the R-shaped surface 24 is formed in place of the conical surface.

<Sixth and Seventh Embodiments>

Figure 7:
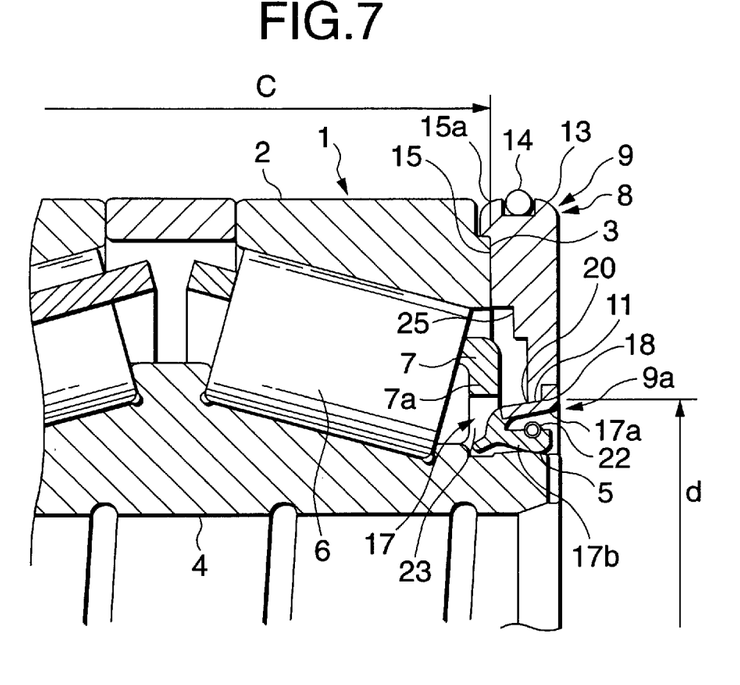
FIG. 7 is a longitudinal sectional view showing a sixth embodiment of a sealing device for a rolling bearing, which is constructed according to the present invention.
Figure 8:
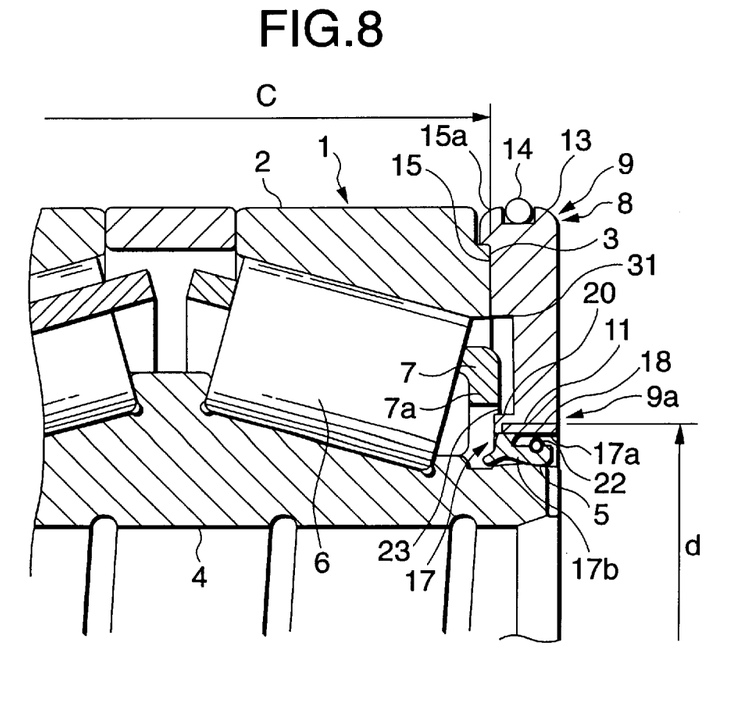
FIG. 8 is a longitudinal sectional view showing a seventh embodiment of a sealing device for a rolling bearing, which is constructed according to the present invention.

In the sixth embodiment (FIG. 7), the seal holder 9 includes a stepped part 25 in place of the conical surface. With provision of the stepped part 25, a holder receiving space 23 for receiving the end of the holder is formed, and the height of the cross section of the seal body 17 is reduced to decrease the inside diameter d of the seal holder portion. In the seventh embodiment (FIG. 8), the seal holder 9 includes a long recess portion 31 to reduce the height of the cross section of the seal body 17.

<Eighth and Ninth Embodiments>

Figure 9:
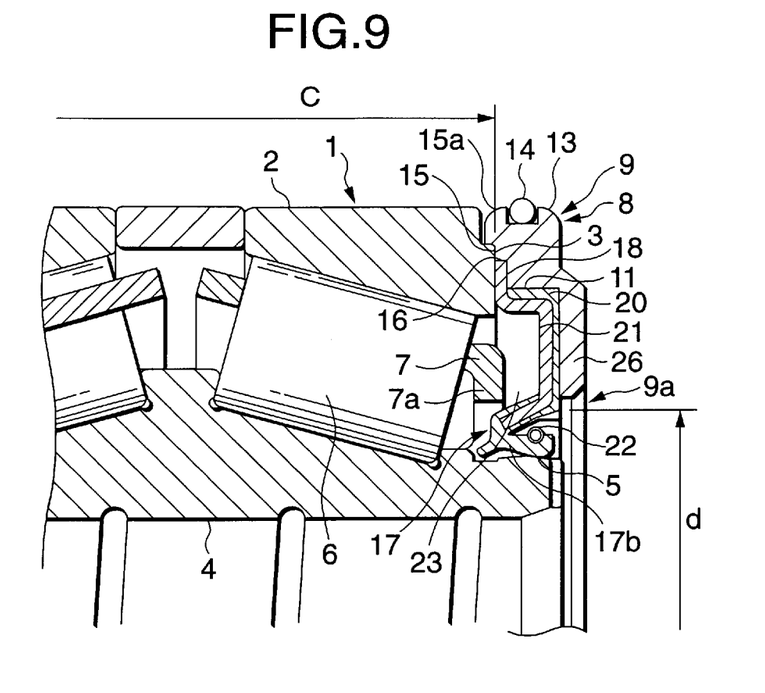
FIG. 9 is a longitudinal'sectional view showing a eighth embodiment of a sealing device for a rolling bearing, which is constructed according to the present invention.

In the eighth embodiment (FIG. 9), the seal holder 9 includes an outwardly curved portion 26 extended in the axial direction. With provision of the outwardly curved portion, the seal body 17 with the rectangular portion 21 may be disposed without using the conical surface.

Figure 10:
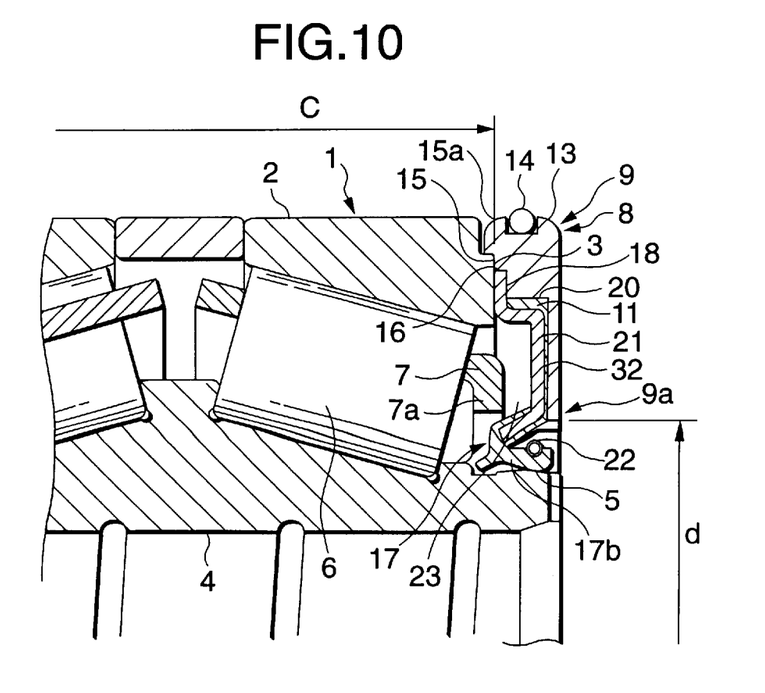
FIG. 10 is a longitudinal sectional view showing a ninth embodiment of a sealing device for a rolling bearing, which is constructed according to the present invention.

In the ninth embodiment (FIG. 10), a deep recess 32 directed from the end of the groove 16 of the seal holder 9 to the outer surface is provided. Provision of the holder receiving space defined by the deep recess 32 allows a member like the seal body 17 with the rectangular portion 21 to be disposed, while reducing the inside diameter d of the seal holder portion.

<Tenth Eleventh, Twelfth Embodiments>

Figure 11:
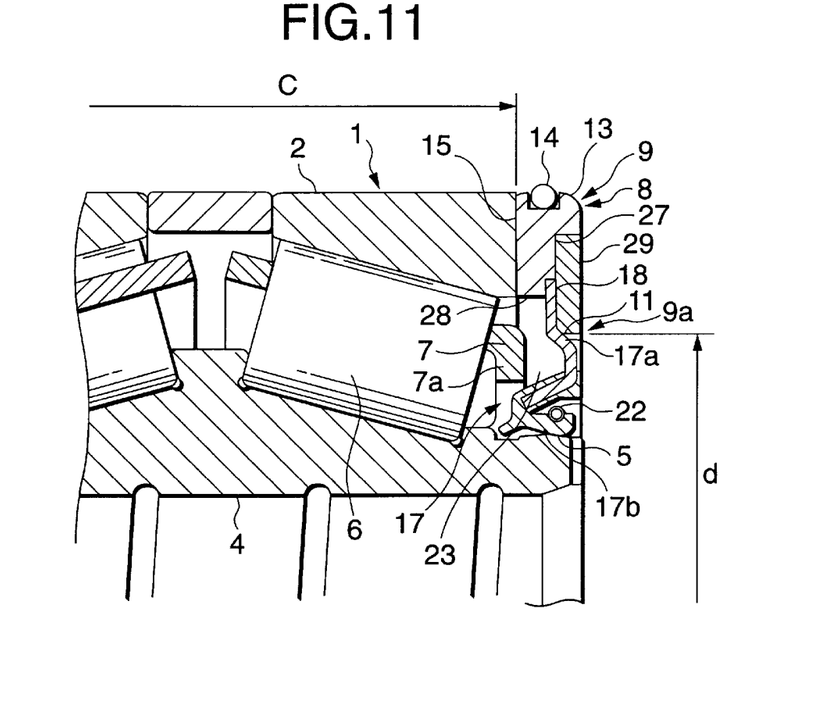
FIG. 11 is a longitudinal sectional view showing a tenth embodiment of a sealing device for a rolling bearing, which is constructed according to the present invention.

In the tenth embodiment (FIG. 11), the outer surface of the seal holder 9 is curved inwardly to form a recessed surface 27. The outside portion of the recessed surface 27 is mounted between a recess 28 formed on the inner aide of the recessed surface 27 and a holding plate 29 attached to the recessed surface 27.

Figure 12:
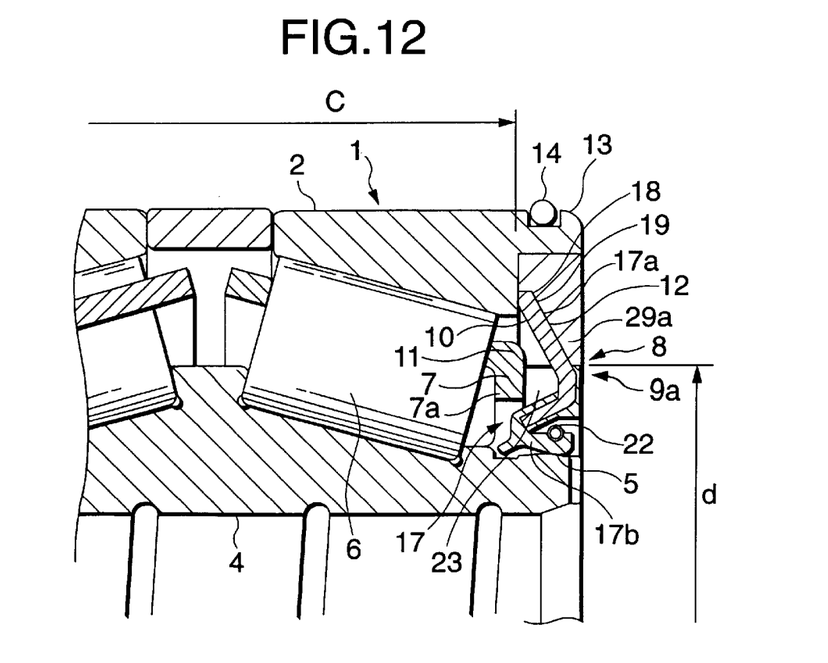
FIG. 12 is a longitudinal sectional view showing a eleventh embodiment of a sealing device for a rolling bearing, which is constructed according to the present invention.

The eleventh embodiment (FIG. 12) is substantially same as the first embodiment shown in FIG. 2 except for a structure of the seal holder 9. In the eleventh embodiment, the seal holder is integrally formed with the outer ring 2, and the seal holder 9 further comprises a holding plate 29a for securing the seal body 17.

Figure 13:
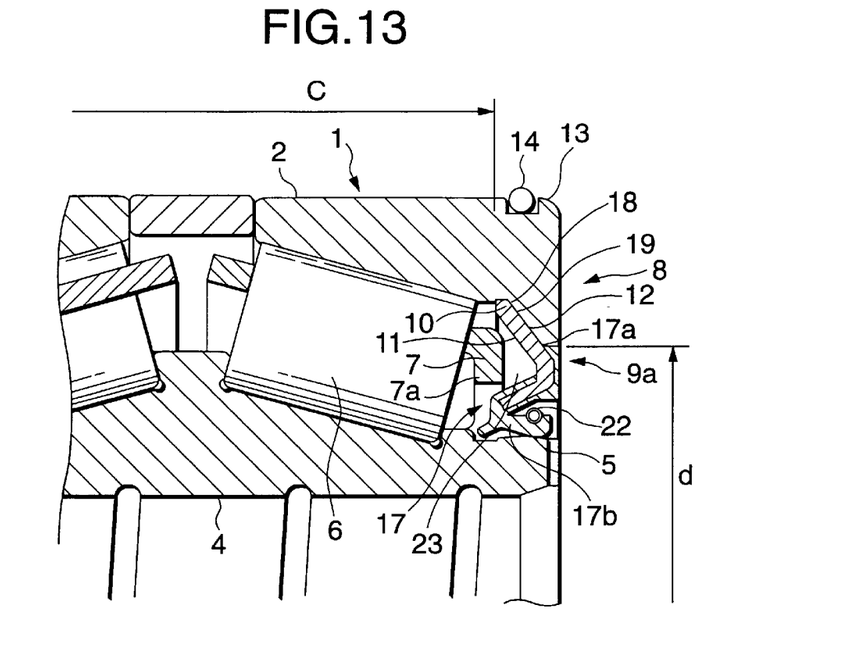
FIG. 13 is a longitudinal sectional view showing a twelfth embodiment of a sealing device for a rolling bearing, which is constructed according to the present invention.

The twelfth embodiment (FIG. 13) is substantially same as the first embodiment shown in FIG. 2 except for a structure of the seal holder 9. In the twelfth embodiment, the seal holder is integrally formed with the outer ring 2, and the seal body 17 is directly secured on the seal holder 9.

In the above-mentioned embodiments (FIGS. 1 to 5 and 7 to 11), the seal body 17 is attached to the seal holder portion 9a of the seal holder 9, separately provided, closely engaged with the outer ring 2. In the case where the seal holder portion 9a is directly formed in the outer ring 2, and the seal body 17 is attached to the seal holder portion 9a (fifth embodiment (FIG. 6), eleventh embodiment (FIG. 12), twelfth embodiment (FIG. 13)), the member to which the seal body 17 is attached may be properly selected.

The embodiments of FIGS. 3 to 13 enjoy useful effects as well as those by the FIG. 2 embodiment. The remaining constructions of those embodiments are substantially equal to the corresponding one of the FIG. 2 embodiment. Like or equivalent portions are designated by similar reference numerals in FIG. 2.

Another embodiment of a sealing device according to the present invention in which the seal body 17 has a hard structure capable of enduring a pressure applied when the bearing is lifted will be described.

The seal body 17 is provided with a metal ring (reinforcing core member) 17a of which the cross sectional width is large as compared with the conventional one in such a manner that the metal ring 17a maintains a posture of the sub-assembly of the bearing and the sealing device and simultaneously endures a dead load (that is, the own weight) of the sub-assembly when the sub-assembly is suspended by the bearing suspending tool 800 to assemble with the chock.

The metal ring 17a preferably has a uniform thickness larger than the conventional one by twice or more, more preferably has a uniform thickness larger than the same by 2.5 times or more.

The metal ring 17a may have an irregular thickness capable of keeping the predetermined posture of the sub-assembly while the sub-assembly is suspended by the bearing suspending tool 800.

With the structure including the reinforcing core member 17a, the bearing can endure a pressure applied thereto when the seal is directly lifted with a bearing suspending tool (thirteenth embodiment (FIG. 14), fourteenth embodiment (FIG. 15), fifteenth embodiment (FIG. 16)).

Figure 14:
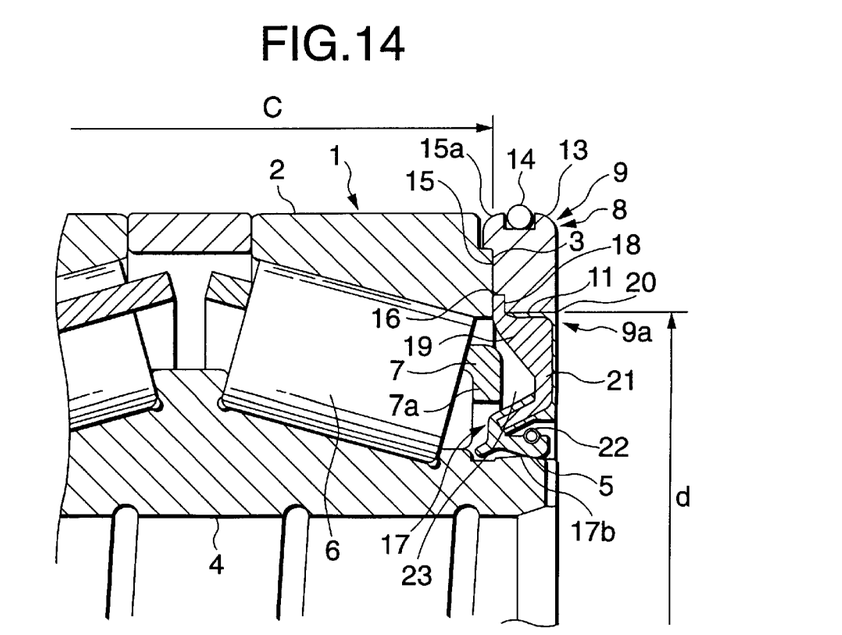
FIG. 14 is a longitudinal sectional view showing a thirteenth embodiment of a sealing device for a rolling bearing, which is constructed according to the present invention.
Figure 15:
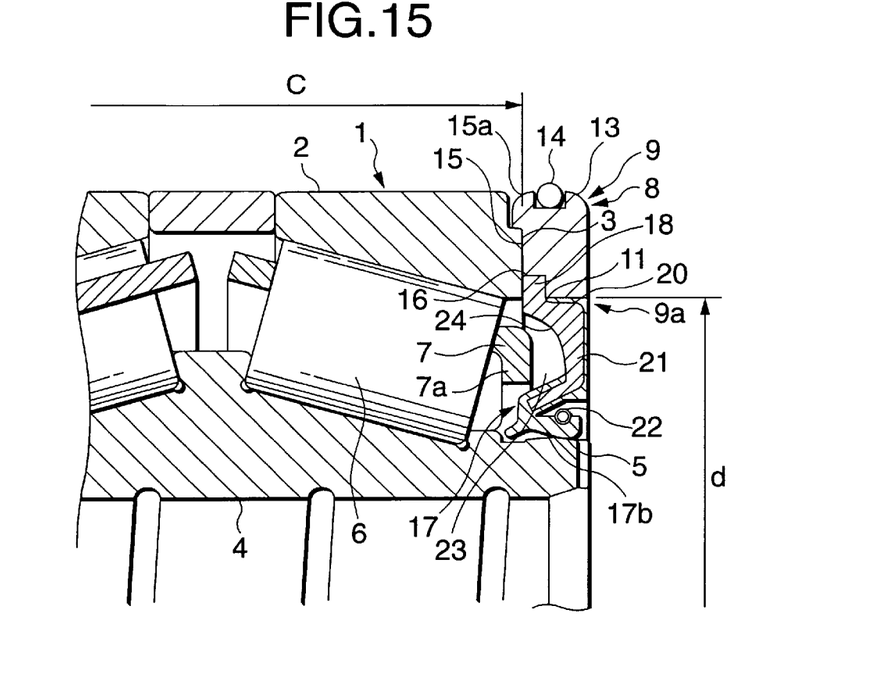
FIG. 15 is a longitudinal sectional view showing a fourteenth embodiment of a sealing device for a rolling bearing, which is constructed according to the present invention.
Figure 16:
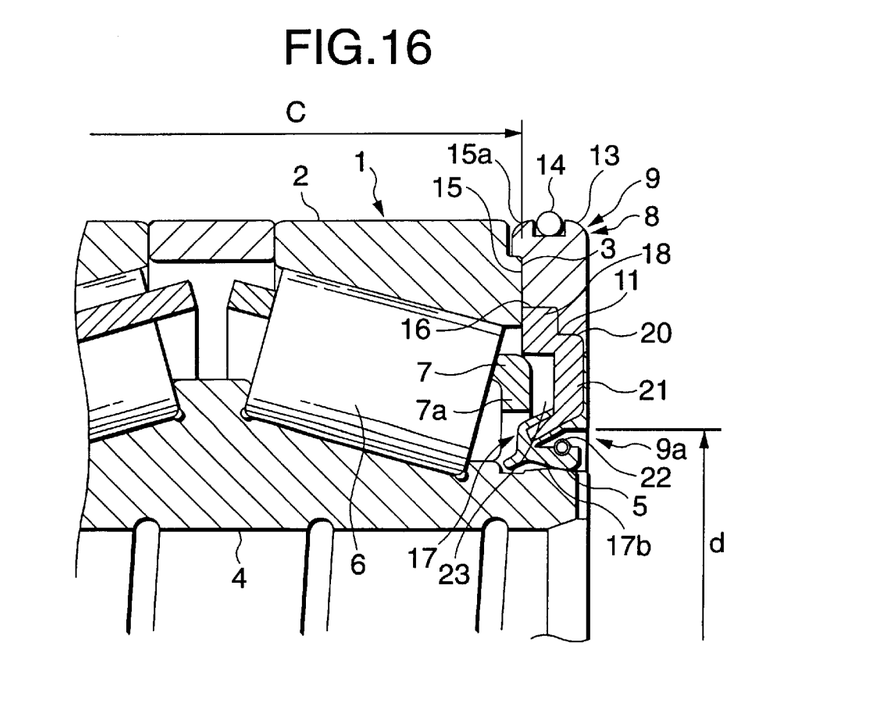
FIG. 16 is a longitudinal sectional view showing a fifteenth embodiment of a sealing device for a rolling bearing, which is constructed according to the present invention.

In the thirteenth embodiment of FIG. 14, the seal body 17 includes a conical surface 10; in the fourteen embodiment of FIG. 15, the seal body 17 includes an R-shaped portion 24; and in the fifteenth embodiment of FIG. 16, a rectangular portion 21 is formed. In this way, a holder receiving space 23 for receiving the end of the holder is formed.

In the-thirteenth to fifteenth embodiments, the inside diameter d of the seal holder portion 9a is not reduced. When the bearing is lifted by the bearing suspending tool 800, the bearing suspending tool 800 directly presses the seal body 17; however, the sealing device is normally operable since the reinforcing core member 17a has a sufficiently strength.

The present invention is applicable to any other bearing than the four-raw tapered roller bearing if it is of the type in which it uses the sealing device and utilizes an assembling too, and the holder is protruded out of the side surface of the bearing unit.

Figure 17:
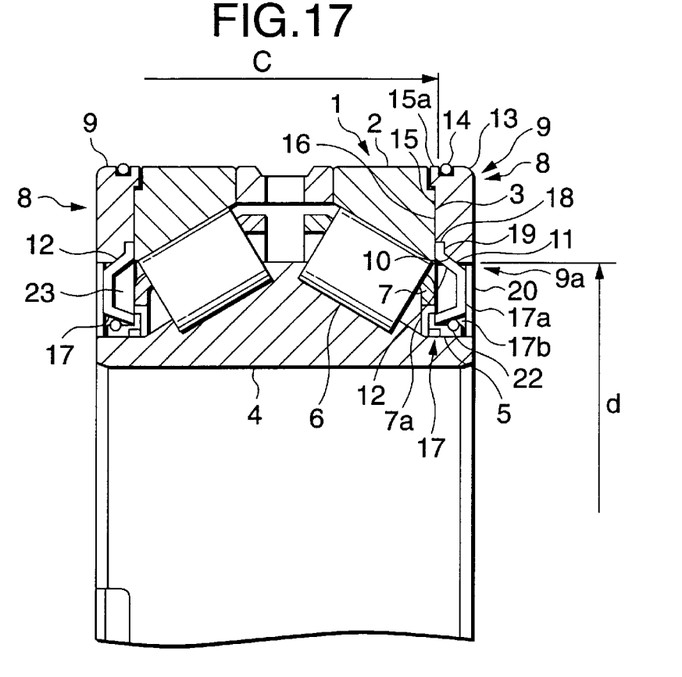
FIG. 17 is a longitudinal sectional view showing a sixteenth embodiment of a sealing device for a double-raw tapered roller bearing, which is constructed according to the present invention.
Figure 18:
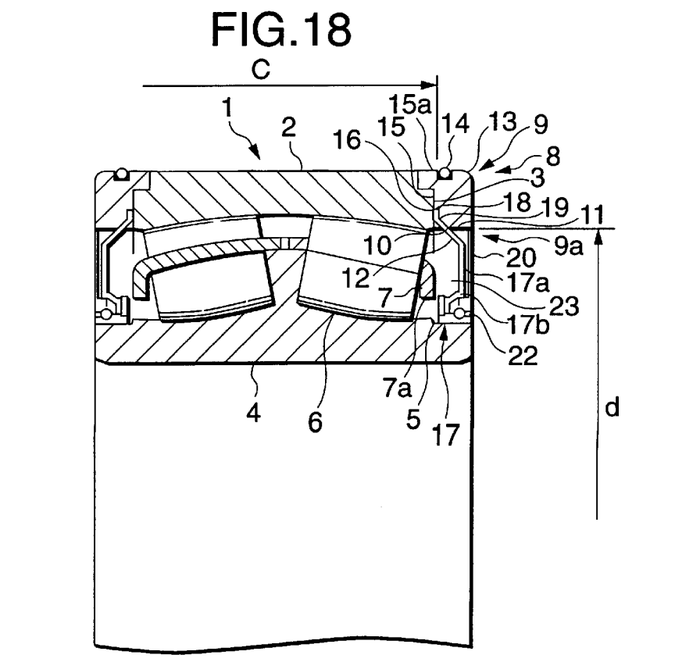
FIG. 18 is a longitudinal sectional view showing a seventeenth embodiment of a sealing device for a self-aligning roller bearing, which is constructed according to the present invention.

The invention is applicable to a double-raw tapered roller bearing (sixteenth embodiment, FIG. 17), and a sealing device for a self-aligning tapered roller bearing (seventeenth embodiment, FIG. 18).

The sealing device thus constructed successfully provides a sealing device for a-rolling bearing which is capable o r satisfying the requirement for eliminating the interference of the sealing member with the cage type holder, maintaining the high load capacity performance, and accepting the bearing suspending tool usually used for the bearing.

The sealing device of the invention has the following useful effects.

1) A protruded part of the holder from the bearing unit is put in a space while the structures to reduce the inside diameter of the seal holder portion and to enable the seal to be directly suspended.

2) There is no need of adopting the disadvantageous measure of the conventional technique; to avoid the interference of the holder, the width of the seal holder is increased, and the sealing member is located close to outside.

3) The increase of the inside diameter of the seal holder portion is not required.

4) The space of the bearing is not limited.

5) The bearing suspending tool, usually used for the bearing, may be used.

6) The seal body is not damaged.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A sealing device for a roll bearing which includes an outer ring, an inner ring, a rolling element rotatably interposed between said outer and inner rings, and a retainer, said sealing device comprising:

a seal holder having a seal holder portion;

a seal body attached to said seal holder portion, wherein a portion of said retainer is received in a sealing space defined by said seal holder portion while said portion of said retainer is disposed outside a range of interference with said seal holder portion and said seal body; and wherein said seal holder comprises means for reducing an inside diameter of said seal holder, wherein said reducing means comprises a first inclined portion inclined relative to a rotational axis of said sealing device, and said first inclined portion is part of said seal holder.

2. A sealing device for a roll bearing according to claim 1, in which said seal holder is integrally formed with said outer ring.

3. A sealing device for a roll bearing according to claim 1, in which said reducing means further comprises a second inclined portion inclined relative to a rotational axis of said sealing device, and said second inclined portion is formed on said seal body.

4. A sealing device for a roll bearing according to claim 3, in which said second inclined portion is formed by one of a tapered surface, a curved surface and a stepped surface.

5. A sealing device for a roll bearing according to claim 1, in which said first inclined portion is formed by one of a tapered surface, a curved surface and a stepped surface.

6. A sealing device for a roll bearing according to claim 1, in which said reducing means comprises a recess portion which has a U-shaped cross section and is formed on said seal holder portion.

7. A sealing device for a roll bearing according to claim 1, in which said reducing means comprises an outwardly curved portion which is protruded in the axial direction of said sealing device and is formed on said seal holder portion.

8. A sealing device for a roll bearing according to claim 1, further comprising:

a holding plate for securing a part of said seal body between said seal holder and said holding plate.

9. A sealing device for a roll bearing according to claim 1, wherein at least part of a seal holder inner surface, which faces in a direction of said rolling element, defines said first inclined portion, wherein said first inclined portion tapers away from said rolling element as said seal holder extends towards said rotational axis.

10. A sealing device for a roll bearing which includes an outer ring, an inner ring, a rolling element rotatably interposed between said outer and inner rings, and a retainer, said sealing device comprising:

a seal holder having a seal holder portion, at least part of said seal holder portion defining an inclined portion inclined relative to a rotational axis of said sealing device, wherein said inclined portion is part of said seal holder; and a seal body attached to said seal holder portion, wherein a portion of said retainer is received in a sealing space defined by said seal holder portion while said portion of said retainer is disposed outside a range of interference with said seal holder portion and said seal body, wherein said seal body comprises a reinforcing means for reinforcing a sub-assembly state of said seal device so as to withstand a pressure created when said bearing is lifted with a bearing suspending tool.

11. A sealing device for a roll bearing according to claim 10, in which said reinforcing means comprises a metal ring having an irregular cross-section.

12. A sealing device for a roll bearing according to claim 11 further comprising:

means for reducing an inside diameter of said seal holder.

13. A sealing device for a roll bearing according to claim 12 in which said seal holder is integrally formed with said outer ring.

14. A sealing device for a roll bearing according to claim 12, in which said reducing means comprises an inclined portion inclined relative to a rotational axis of said sealing device.

15. A sealing device for a roll bearing according to claim 14, in which said inclined portion is formed by one of a tapered surface and a curved surface.

16. A sealing device for a roll bearing according to claim 10, wherein said inclined portion is defined by at least part of a seal holder inner surface, which faces in a direction of said rolling element, wherein said inclined portion tapers away from said rolling element as said seal holder extends towards said rotational axis.

* * * * *